United States Patent
Eiselt

(10) Patent No.: US 7,460,297 B2
(45) Date of Patent: Dec. 2, 2008

(54) COMPENSATION FOR SPECTRAL POWER TILT FROM SCATTERING

(75) Inventor: Michael H. Eiselt, Middeltown, NJ (US)

(73) Assignee: Pivotal Decisions LLC, Las Vegas, NV (US)

( * ) Notice: Subject to any disclaimer, the term of this patent is extended or adjusted under 35 U.S.C. 154(b) by 0 days.

(21) Appl. No.: 11/515,196

(22) Filed: Aug. 31, 2006

(65) Prior Publication Data

US 2007/0008612 A1    Jan. 11, 2007

Related U.S. Application Data

(62) Division of application No. 10/427,898, filed on Apr. 30, 2003.

(60) Provisional application No. 60/377,084, filed on Apr. 30, 2002.

(51) Int. Cl.
*H04B 10/17* (2006.01)
*H04B 10/12* (2006.01)

(52) U.S. Cl. .................. 359/337.11; 359/334

(58) Field of Classification Search ............. 359/337.1, 359/337.11, 337.4, 334
See application file for complete search history.

(56) References Cited

U.S. PATENT DOCUMENTS

| | | | | |
|---|---|---|---|---|
| 4,229,831 A | 10/1980 | Lacher | ............. | 398/214 |
| 4,535,459 A | 8/1985 | Hogge, Jr. | ............. | 375/324 |
| 4,636,859 A | 1/1987 | Vernhet et al. | ............. | 348/468 |
| 4,710,022 A | 12/1987 | Soeda et al. | ............. | 356/73.1 |
| 5,224,183 A | 6/1993 | Dugan | ............. | 385/24 |
| 5,225,922 A | 7/1993 | Chraplyvy et al. | ............. | 398/94 |
| 5,267,071 A | 11/1993 | Little et al. | ............. | 398/162 |
| 5,299,048 A | 3/1994 | Suyama | ............. | 398/181 |
| 5,321,541 A | 6/1994 | Cohen | ............. | 398/82 |
| 5,455,703 A | 10/1995 | Duncan et al. | ............. | 398/136 |
| 5,559,625 A | 9/1996 | Smith et al. | ............. | 398/66 |
| 5,613,210 A | 3/1997 | Van Driel et al. | ............. | 455/45 |
| 5,726,784 A | 3/1998 | Alexander et al. | ............. | 398/91 |
| 5,737,118 A | 4/1998 | Sugaya et al. | ............. | 359/341.43 |
| 5,778,116 A | 7/1998 | Tomich | ............. | 385/16 |
| 5,790,285 A | 8/1998 | Mock | ............. | 398/21 |
| 5,812,290 A | 9/1998 | Maeno et al. | ............. | 398/45 |
| 5,877,881 A | 3/1999 | Miyauchi et al. | ............. | 398/193 |
| 5,903,613 A | 5/1999 | Ishida | ............. | 375/340 |
| 5,914,794 A | 6/1999 | Fee | ............. | 398/20 |
| 5,914,799 A | 6/1999 | Tan | ............. | 398/92 |
| 5,936,753 A | 8/1999 | Ishikaawa | ............. | 398/72 |

(Continued)

FOREIGN PATENT DOCUMENTS

JP     01115230     5/1989

(Continued)

*Primary Examiner*—Eric Bolda
(74) *Attorney, Agent, or Firm*—Woodcock Washburn LLP

(57) ABSTRACT

A method and apparatus for adjusting the tilt of an inline amplifier. A controller reads the power of an amplifier twice. Then, if there is a change in power, a difference is calculated by subtracting the first power from the second power. A tilt correction is calculated by multiplying the change in power by a negative constant. The system then adjusts a gain control device by the tilt correction. Because of the simplicity of the algorithm and location of the controller, adjustments can be made to the gain tilt within approximately 100 μs and system failures can be avoided.

37 Claims, 6 Drawing Sheets

U.S. PATENT DOCUMENTS

| | | | |
|---|---|---|---|
| 5,940,209 A | 8/1999 | Nguyen | 359/341.1 |
| 5,963,350 A | 10/1999 | Hill | 398/70 |
| 5,963,361 A | 10/1999 | Taylor et al. | 359/337 |
| 5,995,694 A | 11/1999 | Akasaka et al. | 340/7.37 |
| 6,005,702 A | 12/1999 | Suzuki et al. | 398/185 |
| 6,021,245 A | 2/2000 | Berger et al. | 385/123 |
| 6,038,061 A | 3/2000 | Sugaya | 359/337 |
| 6,038,062 A | 3/2000 | Kosaka | 359/337 |
| 6,055,092 A * | 4/2000 | Sugaya et al. | 359/337 |
| 6,057,959 A * | 5/2000 | Taylor et al. | 359/337.13 |
| 6,061,171 A * | 5/2000 | Taylor et al. | 359/337.1 |
| 6,075,634 A | 6/2000 | Casper et al. | 398/139 |
| 6,078,414 A | 6/2000 | Iwano | 398/182 |
| 6,081,360 A | 6/2000 | Ishikawa et al. | 398/147 |
| 6,084,694 A | 7/2000 | Milton et al. | 398/83 |
| 6,088,152 A | 7/2000 | Berger et al. | 359/334 |
| 6,108,074 A | 8/2000 | Bloom | 356/73.1 |
| 6,122,095 A | 9/2000 | Fatehi | 359/337 |
| 6,151,334 A | 11/2000 | Kim et al. | 370/468 |
| 6,157,477 A | 12/2000 | Robinson | 398/147 |
| 6,160,614 A | 12/2000 | Unno | 356/73.1 |
| 6,163,392 A | 12/2000 | Condict et al. | 398/1 |
| 6,163,636 A | 12/2000 | Stentz et al. | 385/24 |
| 6,173,094 B1 | 1/2001 | Bowerman et al. | 385/24 |
| 6,177,985 B1 | 1/2001 | Bloom | 356/73.1 |
| 6,198,559 B1 | 3/2001 | Gehlot | 398/161 |
| 6,212,001 B1 | 4/2001 | Bode et al. | 359/337.1 |
| 6,229,599 B1 | 5/2001 | Galtarossa | 356/73.1 |
| 6,236,481 B1 | 5/2001 | Laor | 398/9 |
| 6,236,499 B1 | 5/2001 | Berg et al. | 359/341.2 |
| 6,246,510 B1 | 6/2001 | BuAbbud et al. | 359/337 |
| 6,259,553 B1 | 7/2001 | Kinoshita | 359/337 |
| 6,259,554 B1 | 7/2001 | Shigematsu et al. | 359/337 |
| 6,259,693 B1 | 7/2001 | Ganmukhi et al. | 370/366 |
| 6,259,845 B1 | 7/2001 | Sardesai | 385/123 |
| 6,272,185 B1 | 8/2001 | Brown | 375/340 |
| 6,275,315 B1 | 8/2001 | Park et al. | 398/148 |
| 6,288,811 B1 | 9/2001 | Jiang et al. | 398/79 |
| 6,288,813 B1 | 9/2001 | Kirkpatrick et al. | 398/136 |
| 6,307,656 B2 | 10/2001 | Terahara | 398/139 |
| 6,317,231 B1 | 11/2001 | Al-Salameh et al. | 398/34 |
| 6,317,255 B1 | 11/2001 | Fatehi et al. | 359/341.44 |
| 6,323,950 B1 | 11/2001 | Kim et al. | 356/477 |
| 6,327,060 B1 | 12/2001 | Otani et al. | 398/83 |
| 6,356,384 B1 | 3/2002 | Islam | 359/334 |
| 6,359,726 B1 * | 3/2002 | Onaka et al. | 359/337.1 |
| 6,359,729 B1 | 3/2002 | Amoruso | 359/341.1 |
| 6,369,938 B1 * | 4/2002 | Sugaya et al. | 359/341.42 |
| 6,377,394 B1 | 4/2002 | Drake et al. | 359/341.41 |
| 6,388,801 B1 | 5/2002 | Sugaya et al. | 359/334 |
| 6,396,853 B1 | 5/2002 | Humphrey et al. | 370/535 |
| 6,400,499 B2 * | 6/2002 | Sugaya et al. | 359/341.42 |
| 6,411,417 B1 * | 6/2002 | Roberts et al. | 398/177 |
| 6,421,169 B1 | 7/2002 | Bonnedal et al. | 359/337.1 |
| 6,456,427 B1 | 9/2002 | Chen et al. | 359/337.1 |
| 6,480,326 B2 | 11/2002 | Papernyl et al. | 359/334 |
| 6,483,631 B1 * | 11/2002 | Cheng et al. | 359/337.11 |
| 6,515,779 B2 | 2/2003 | Fee | 359/161 |
| 6,519,082 B2 | 2/2003 | Ghera et al. | 359/341.4 |
| 6,522,460 B2 | 2/2003 | Bonnedal et al. | 359/341.42 |
| 6,574,037 B2 | 6/2003 | Islam et al. | 359/334 |
| 6,603,596 B2 | 8/2003 | Inagaki et al. | 359/341.4 |
| 6,687,045 B2 | 2/2004 | Lelic | 359/337.1 |
| 6,728,026 B2 | 4/2004 | Lee et al. | 359/337.1 |
| 6,744,958 B2 | 6/2004 | Inagaki et al. | 385/123 |
| 6,744,988 B2 | 6/2004 | Leclerc et al. | 398/102 |
| 6,807,232 B2 | 10/2004 | Nicholson et al. | 375/240.26 |
| 6,826,201 B2 | 11/2004 | Hind | 370/535 |
| 6,943,937 B2 | 9/2005 | Lelic et al. | 359/337.11 |
| 6,944,163 B2 | 9/2005 | Bottorff et al. | 370/395.5 |
| 6,950,448 B2 | 9/2005 | Tornetta et al. | 370/537 |
| 7,016,105 B2 | 3/2006 | Balland et al. | 359/337.1 |
| 7,046,695 B2 | 5/2006 | Silvers | 370/493 |
| 7,061,668 B2 | 6/2006 | Maurer et al. | 359/341.41 |
| 7,139,277 B2 | 11/2006 | Ofek et al. | 370/401 |
| 7,170,906 B2 | 1/2007 | Ofek et al. | 370/498 |
| 2002/0012152 A1 | 1/2002 | Agazzi et al. | 359/189 |
| 2002/0044317 A1 | 4/2002 | Gentner et al. | 359/124 |
| 2002/0044324 A1 | 4/2002 | Hoshida et al. | 359/179 |
| 2002/0044343 A1 * | 4/2002 | Manzur | 359/337.11 |
| 2002/0181045 A1 * | 12/2002 | Uda et al. | 359/124 |
| 2003/0035203 A1 | 2/2003 | Shlifer et al. | 359/337.1 |
| 2003/0048525 A1 * | 3/2003 | Irie | 359/337.1 |

FOREIGN PATENT DOCUMENTS

| | | |
|---|---|---|
| JP | 02238736 | 9/1990 |
| JP | 2002368692 A * | 12/2002 |

\* cited by examiner

COMPENSATION FOR SPECTRAL POWER TILT FROM SCATTERING

CROSS-REFERENCE TO RELATED APPLICATIONS

This application is a division of U.S. application Ser. No. 10/427,898, filed Apr. 30, 2003 and entitled "Compensation for Spectral Power Tilt from Scattering," which claims benefit under 35 U.S.C. § 119(e) of U.S. Provisional Application Ser. No. 60/377,084, filed Apr. 30, 2002 and entitled "Compensation for Spectral Power Tilt from Stimulated Raman Scattering," the contents of which are incorporated by reference herein in their entireties.

FIELD OF THE INVENTION

The present invention relates generally to optical amplifiers used in fiber optics for telecommunications. More particularly, the invention relates to Raman Scattering and dynamic self-adjusting gain tilt optimization for equalizing amplified optical output.

BACKGROUND OF THE INVENTION

In optical fiber communication systems, communication channels can be provided by transmitting signals impressed on laser beams having different wavelengths (WDM). Although optical fiber communication systems utilizing wavelength-distinct modulated channels may carry information over long distances, signals transmitted through optical fibers are attenuated mainly by the cumulative and combined effects of absorption and Rayleigh Scattering. While the signal attenuation per kilometer in optical fibers used for communications is typically low, signals transmitted over increasing transmission distances require periodic amplification.

Stimulated Raman Scattering induces a power tilt over the signals within the C-band and L-band range of transmission frequencies. The power tilt is linear in first order on a logarithmic scale and depends on the overall signal and noise power injected into the fiber and on the fiber Raman coefficient. The tilt does not depend on the distribution of the channels within the band. For instance, the tilt per span amounts to about 0.7 dB per 100 mW signal power in single mode optical fiber (SMF) and about 1 dB per 100 mW signal power in LEAF. In this example, tilt can be defined as the difference in span loss between channel #80 (around 1603 nm) and channel #1 (around 1570 nm). The tilt accumulates linearly (in dB) with the number of spans of optical fiber.

FIG. 1 shows a simplified view of a transport system including a fiber span 210 as is typical in the art. Several inline amplifiers (ILAs) 200 are connected in series in order to transport a signal hundreds or thousands of kilometers.

In the prior art, the Raman power tilt is compensated for by introducing a gain tilt in an ILA. FIG. 2A shows the input power to into ILA 200. FIG. 2B shows the power tilt of the signal after Stimulated Raman Scattering on the fiber. FIG. 2C shows the ILA compensation gain tilt used to correct or compensate for the power tilt. FIG. 2D shows the corrected output of ILA 200.

When channels are accidentally dropped, for example, due to a fiber cut or equipment failure, ILAs 200 maintain the overall gain constant by adjusting the amplifiers to take into account the lower ILA input power. However, as a lower channel count on the fiber leads to a reduced power tilt, the ILAs typically overcompensate for the power tilt and introduce a negative power tilt as shown in FIG. 5.

FIG. 5A shows the fiber input power of a signal with fifty percent fewer channels than shown in FIG. 2A. FIG. 5B shows the power tilt over the signal after Stimulated Raman Scattering. FIG. 5C shows the ILA compensation gain tilt used to correct or compensate for the power tilt. FIG. 5D shows a gain tilt adjustment after the loss of channels. The ILAs now overcompensate for the power tilt and introduce a negative power tilt. The negative power tilt accumulates in the system and can typically reach values of more than 5 dB. For example, if 20 channels are dropped, at 3 dBm each, with 20 spans of LEAF a greater than 8 dB power tilt can be introduced. Such a power tilt usually causes system failure.

Certain prior art systems have attempted to address this problem with varying success.

U.S. Pat. No. 6,088,152 to Berger et al, entitled "Optical Amplifier Arranged To Offset Raman Gain", discloses an invention wherein an optical amplifier adjusts the gain that the amplifier applies to optical signals so the gain favors the signal components at the low end of the bandwidth. A program uses a value representing power into the fiber to index a table of pre-tilt values. The program then determines the difference between a pre-tilt value read out of the table and a pre-tilt value obtained from an optical monitor and adjusts a variable attenuator unit as a function of the difference to obtain the desired pre-tilt of the output signal. The Berger system is comparatively slow. It also requires a static look up table that must be reprogrammed upon certain fiber or amplifier changes.

U.S. Pat. No. 6,356,384 to Islam, entitled "Broadband Amplifier And Communication System", discloses a tilt control device to control gain tilt coupled to splitters, Raman amplifiers, EDFAs and combiners. Islam does not, disclose or suggest a method or controller system for fast automatic tilt correction of gain control.

United States Patent Application Publication No. 2002/0044317 to Gentner, et al., entitled "Control Method And Optical Data Transmission Path For Compensating Changes In Srs-Induced Power Exchange", discloses a device for determining the tilt of all optical spectrums, and then using a quick control and slow control for compensating the tilt. Gentner requires laser equipment for quick response to power fluctuations which raises system cost and complexity.

Therefore, a need exists for a method and a device which permits compensation of the titling of the spectrum fast enough to prevent system shutdown upon loss of channels, and cheaply enough to reduce the cost of deployment in an optical transport system.

SUMMARY OF THE INVENTION

The present invention is an improvement over the prior art by providing a control scheme that can perform fast automatic tilt correction.

The present invention recognizes that the gain tilt is proportional to the fiber input power. As a result, the measured fiber output power (or ILA input power) if scaled by the span loss, can be used to adjust the ILA gain tilt. ILA gain tilt adjustment is then used to offset the tilt induced by Raman Scattering in a rapid automatic fashion to avoid system shutdown due to accidental loss of channels. A controller continuously reads the output power of the ILA and compares it to an earlier value. A change in output power is calculated by subtracting the current ILA output power from the past ILA output power. After the change in output power is calculated, a change in the ILA gain tilt is calculated by multiplying the change in output power by a negative constant. A negative constant produces a positive change in tilt when channels are dropped. The controller transmits a control signal to the ILA to make the necessary corrections. The tilt control hardware and algorithm are incorporated into the ILA hardware. Because of the simplicity of the algorithm and the proximity of the hardware to the ILA, adjustments can be made to the gain tilt within approximately 100 μs. System failures caused by negative tilt accumulation are avoided.

The invention will be better understood from the following more detailed description taken in conjunction with the accompanying drawings.

DETAILED DESCRIPTION OF THE DRAWINGS

A better understanding of the invention can be obtained from the following detailed description of one exemplary embodiment as considered in conjunction with the following drawings in which.

DETAILED DESCRIPTION OF EXEMPLARY EMBODIMENTS

Figure 4:
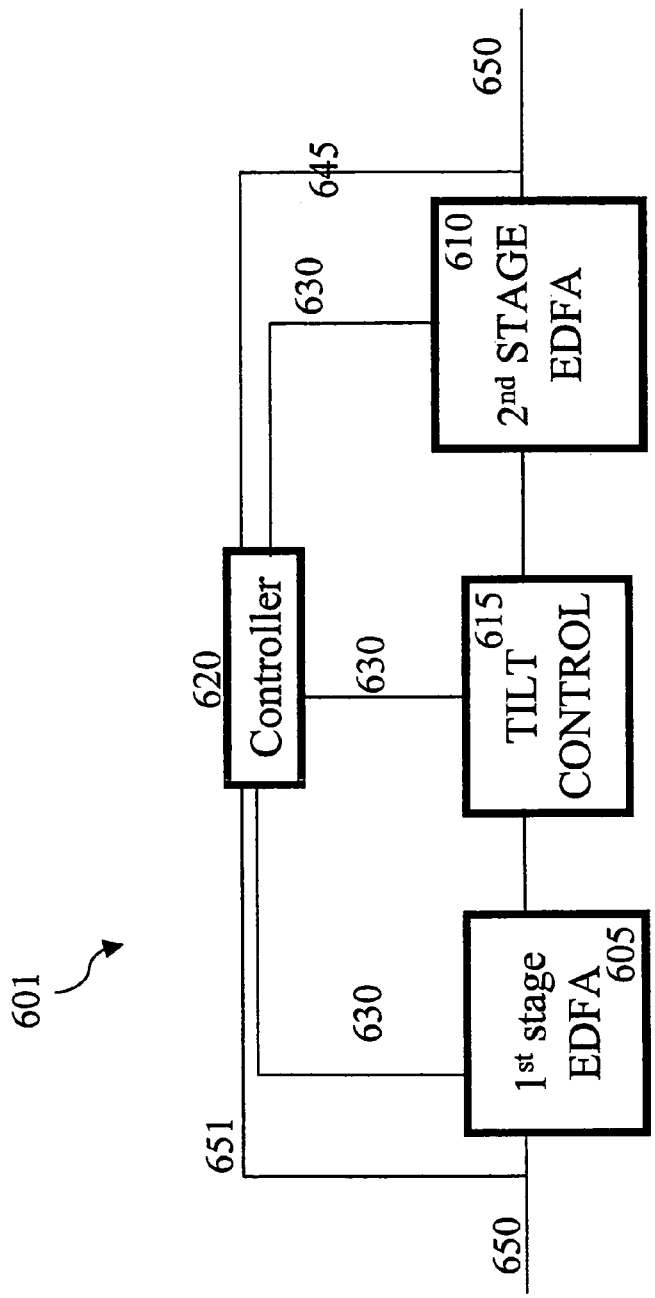
FIG. 4 is a block diagram of a two-stage inline amplifier and controller in accordance with the present invention.
Figure 5:
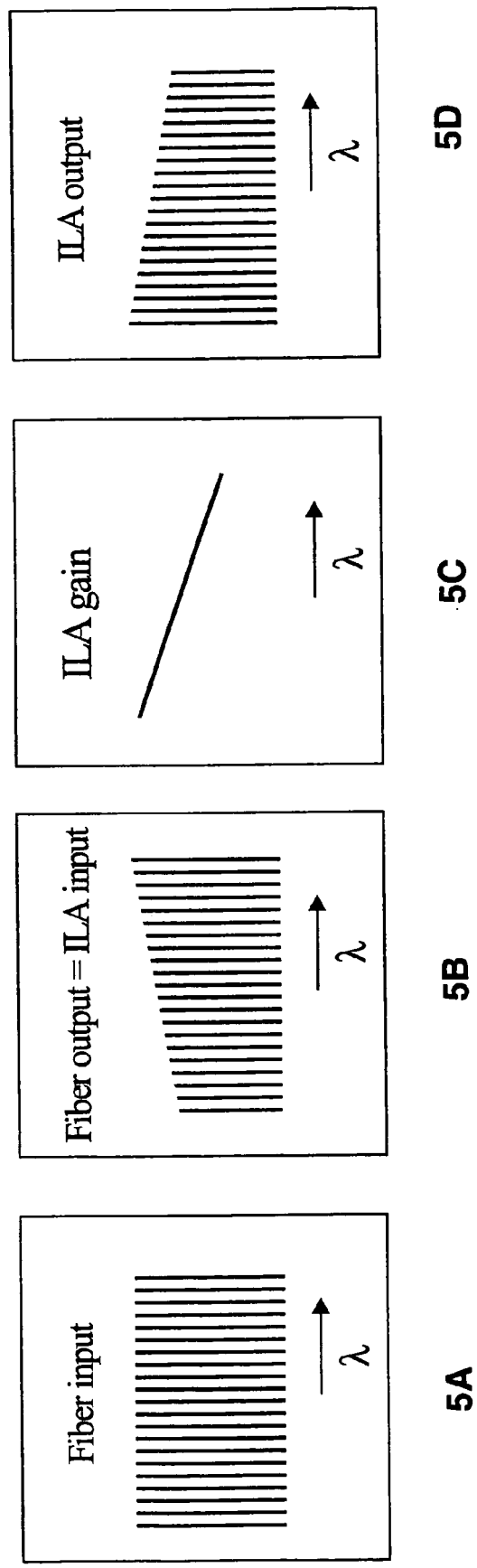
FIG. 5A shows fiber input power for an overcompensating prior art system.
FIG. 5B shows inline amplifier power input for an overcompensating prior art system.
FIG. 5C shows inline amplifier gain for an overcompensating prior art system.
FIG. 5D shows inline amplifier output for an overcompensating prior art system.

FIG. 4 shows a two-stage ILA 601 of the preferred embodiment. ILA 601 is placed inline of optical fiber span 650. The first stage is EDFA 605. A tap 651 reports the input power to EDFA 605 to controller 620. EDFA 605 is operationally connected to a tilt control unit 615. Tilt control 615 in the preferred embodiment is a variable optical attenuator (VOA). In an alternate embodiment, tilt control 615 may be a tunable filter as is known in the art. A second stage EDFA 610 is operationally connected to tilt control 615. The output power of second stage EDFA 610 is reported to controller 620 by tap 645. First stage EDFA 605, second stage EDFA 610 and tilt control unit 615 are all operationally connected to controller 620 by control lines 630.

Figure 6:
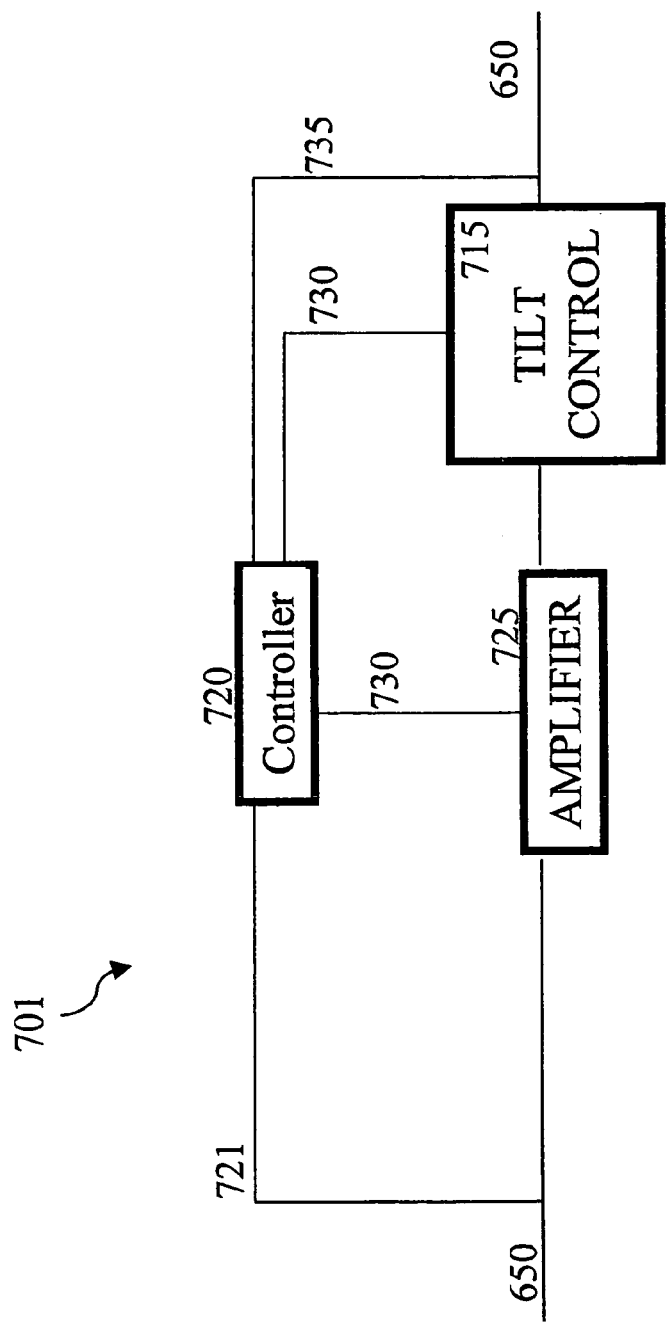
FIG. 6 shows a block diagram of a single inline amplifier and controller in accordance with an alternate embodiment of the present invention.

FIG. 6 shows an alternate embodiment of the invention in which gain tilt is controlled in a single stage inline amplifier 701. Inline amplifier 701 is placed inline of optical fiber span 650. Amplifier 725 is connected to optical fiber 650 and tilt control 715. Both amplifier 725 and tilt control 715 are operably connected to controller 720 by control line 730. A tap 721 communicates the input power to amplifier 725 to controller 720. A tap 735 communicates the output power of inline amplifier 701 to controller 720.

Figure 1:
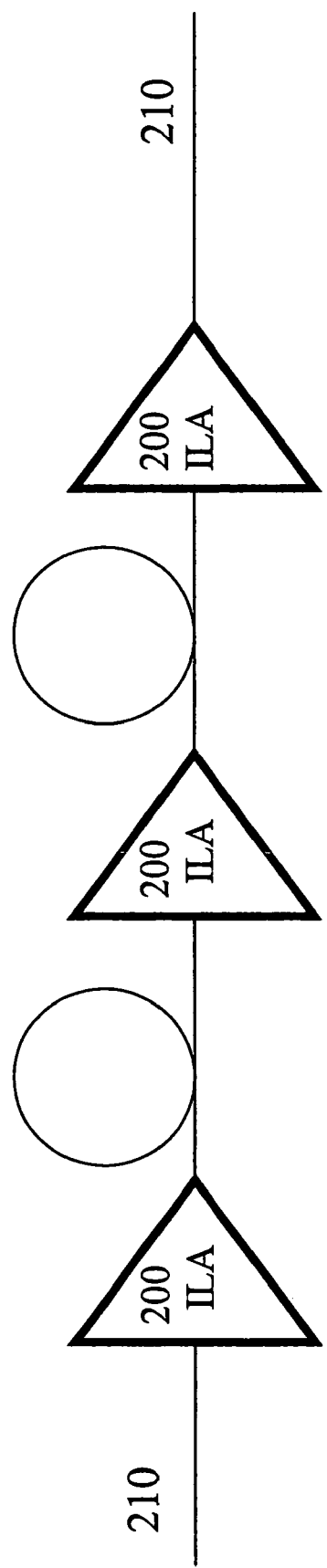
FIG. 1 is a block diagram of the use of in line amplifiers according to the prior art.
Figure 2:
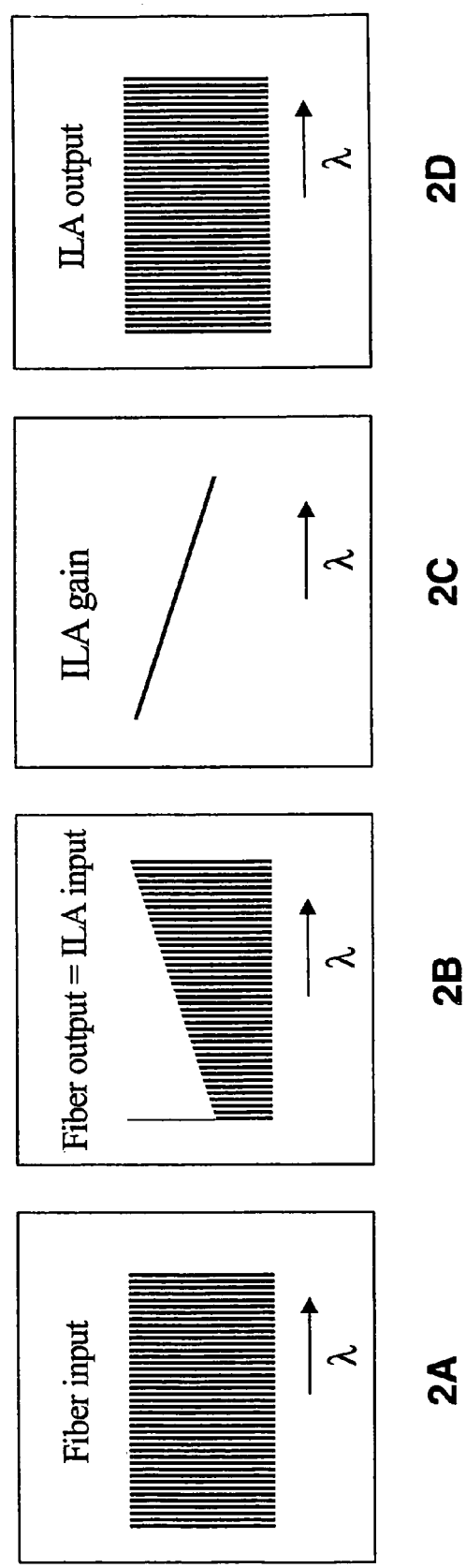
FIG. 2A shows fiber input power for a stable optical system.
FIG. 2B shows inline amplifier power input for a stable optical system.
FIG. 2C shows inline amplifier gain for a stable optical system.
FIG. 2D shows inline amplifier output for a stable optical system.
Figure 3:
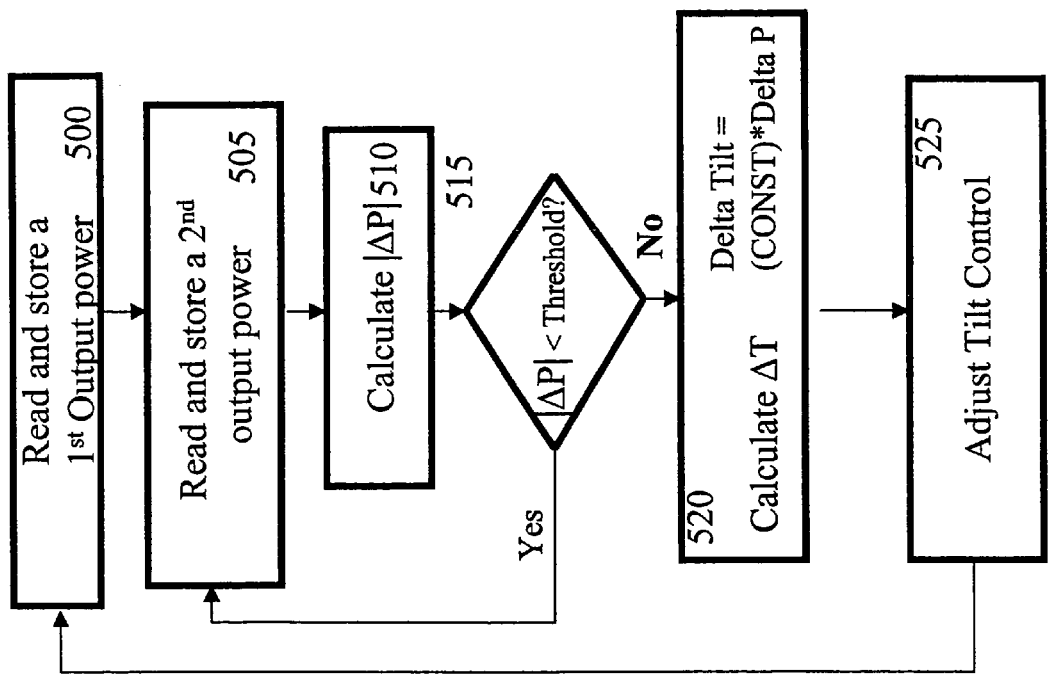
FIG. 3 is a flow chart showing an algorithm for adjusting the tilt gain in an ILA of the present invention.

FIG. 3 is a flow chart of the preferred embodiment of the present invention. In FIG. 3, output power of second stage EDFA 610 is read by controller 620 at tap 645 at step 500 and stored in memory. Then, the output power of second stage EDFA 610 is again read and stored at, step 505. Next, the change in output power is calculated by subtracting the first output power reading from the second output power reading at step 510. In an alternate embodiment described in relation to FIG. 3, input power to first stage EDFA is read by controller 620 at tap 651 at step 500 and stored in memory. Then, the input power to first stage EDFA is again read and stored at step 505. Next, the change in input power is calculated by subtracting the first input power reading from the second input power reading at step 510. In yet another alternate embodiment, described in relation to FIGS. 3 and 6, input power to amplifier 725 is read by controller 720 at tap 721 at step 500 and stored in memory. Then, the input power to the amplifier is again read and stored at step 505. Next, the change in input power is calculated by subtracting the first input power reading from the second input power reading at step 510. In another alternate embodiment described in relation to FIGS. 3 and 6, output power to amplifier 725 is read by controller 720 at tap 735 at step 500 and stored in memory. Then, the output power to the amplifier is again read and stored at step 505. Next, the change in output power is calculated by subtracting the first output power reading from the second output power reading at step 510. For all embodiments, controller 620 then determines if the change in power is less than a threshold value, step 515. The threshold value is on the order of approximately 5 mW if the output power at tap 645 is measured, or approximately 20 μW if the input power at tap 651 is measured to avoid triggering the tilt control by noise in the system.

If the change in power is less than the threshold value, then the controller takes no action and allows the power to remain constant and loops back to step 505. If the change in power is determined to be greater than the threshold value at 515, then the change in ILA gain tilt is calculated by multiplying the change in power by a negative constant, step 520. The constant is set by controller 620 to reflect fiber type, fiber characteristics, or a default average of about 8 dB/W. Controller 620 then transmits a signal to adjust the tilt control by the calculated change in tilt, step 525. After adjusting the tilt control, controller 620 loops back to step 500.

The invention provides for three different types of tilt control. First, tilt control may be provided by a single stage, double stage or multi-stage amplifier combined with a VOA. To change the tilt, the VOA is activated to attenuate all wavelengths equally. To compensate for the attenuation, the gain of one or more stages of the amplifier is increased. The tilt is changed due to the larger gain of the amplifier stages even though the overall gain of the amplifier-VOA combination remains constant.

In a second embodiment, a dynamic gain equalizer (DGE) attenuates the loss from the amplifiers on a channel-by-channel or band-by-band basis. The dynamic gain equalizer can be adjusted without adjusting the amplifiers.

In a third embodiment, an optical filter can be designed to introduce a broadband tilt. This tilt can be tuned by changing the voltage or similar adjustment of the optical filter.

Because of the simplicity of the algorithm and because the algorithm runs on the hardware within the ILA to be adjusted, adjustments can be made to the gain tilt within approximately 100 μs and system failures from upstream channel failure caused by negative tilt accumulation are avoided. Manual tilt changes, tilt changes via the management channel, triggered by a tuning algorithm, or any other methods for making tilt changes are still possible.

Although the invention has been described with reference to one or more preferred embodiments, this description is not to be construed in a limiting sense. There is modification of the disclosed embodiments, as well as alternative embodiments of this invention, which will be apparent to persons of ordinary skill in the art, and the invention shall be viewed as limited only by reference to the following claims.

The invention claimed is:

1. A system for compensating for spectral power tilt, the system comprising:
an optical amplifier connected to an optical fiber; and
a controller connected to the optical amplifier,
wherein the controller is configured to compare a currently measured power of the optical amplifier to a previously measured power of the optical amplifier to determine a change in power, and
wherein the controller is configured to update a gain tilt of the optical amplifier to compensate for a change in the spectral power tilt when the change in power exceeds a predetermined threshold value.

2. The system of claim 1 wherein the update takes place about once every 100 μs.

3. The system of claim 1 wherein the optical amplifier comprises a first stage EDFA and a second stage EDFA and
wherein the system further comprises a variable optical attenuator connected to the second stage EDFA and to the controller.

4. The system of claim 3 wherein the previously measured power includes a first output power of the second stage EDFA, and wherein the currently measured power includes a second later output power of the second stage EDFA, and
wherein the controller is configured to compare the change in power to the predetermined threshold value and to adjust the gain of the second stage EDFA to compensate for spectral power tilt if the change in power exceeds the predetermined threshold value.

5. The system of claim 4 wherein the predetermined threshold value is approximately 5 mW.

6. The system of claim 4 wherein the controller is configured to adjust the gain by reducing the variable optical attenuator by an amount proportional to the change in power.

7. The system of claim 6 wherein the amount is multiplied by a negative constant value.

8. The system of claim 7 wherein the negative constant value is related to the fiber.

9. The system of claim 1 further comprising a tilt controller connected to the optical amplifier,
wherein the controller is configured to alter at least one setting of the tilt controller to compensate for the change in the spectral power tilt.

10. The system of claim 9 wherein the tilt controller is a second stage of the optical amplifier.

11. The system of claim 9 wherein the tilt controller includes a dynamic gain equalizer, and
wherein the controller is configured to alter the at least one setting of the dynamic gain equalizer by changing a loss of the dynamic gain equalizer on a channel-by-channel basis.

12. The system of claim 9 wherein the tilt controller includes a variable optical attenuator.

13. The system of claim 9 wherein the tilt controller includes a tunable filter.

14. The system of claim 9 wherein the currently measured power and the previously measured power define respective output powers of the optical amplifier.

15. The system of claim 9 wherein the currently measured power and the previously measured power define respective input powers of the optical amplifier.

16. The system of claim 9 wherein the predetermined threshold value is about 5 mW.

17. The system of claim 9 wherein the predetermined threshold value is about 20 μW.

18. The system of claim 9 wherein the controller is configured to compensate by a value of delta tilt where:
delta tilt =K* delta P and
where K =8$d$B/W and delta P=the predetermined threshold value.

19. The system of claim 3 wherein the previously measured power includes a first input power of the first stage EDFA,
wherein the currently measured power includes a second later input power of the first stage EDFA, and
wherein the controller is configured to compare the change in power to the predetermined threshold value and to adjust the gain of the second stage EDFA to compensate for spectral power tilt if the change in power exceeds the predetermined threshold value.

20. The system of claim 19 wherein the predetermined threshold value is approximately 5 mW.

21. The system of claim 19 wherein the controller is configured to adjust the gain by reducing the variable optical attenuator by an amount proportional to the change in power.

22. The system of claim 21 wherein the amount is multiplied by a negative constant value.

23. The system of claim 22 wherein the negative constant value is related to the optical fiber.

24. An optical system for compensating for spectral power tilt, the system comprising:
a fiber span configured to transport an optical signal; and
an inline amplifier coupled to the fiber span, the inline amplifier comprising;
an optical amplifier; and
a controller coupled to the optical amplifier,
wherein the controller is configured to compare a currently measured power of the inline amplifier to a previously measured power of the inline amplifier to determine a change in power, and
wherein the controller is configured to adjust a gain tilt of the optical amplifier when the change in power associated with the inline amplifier is at least equal to a predetermined threshold value.

25. The system of claim 24 wherein the inline amplifier further comprises a tilt controller coupled to the optical amplifier and the controller.

26. The system of claim 24 wherein the previously measured power includes a first output power of the inline amplifier and the currently measured power includes a second, subsequent output power of the inline amplifier, and
wherein the controller is configured to calculate the change in power based on the first and second measured output powers.

27. The system of claim 24 wherein the previously measured power includes a first input power of the inline amplifier and the currently measured power includes a second, subsequent input power of the inline amplifier, and
wherein the controller is configured to calculate the change in power based on the first and second measured input powers.

28. The system of claim 24 wherein the predetermined threshold value is 5 mW.

29. The system of claim 24 wherein the predetermined threshold value is 20 µW.

30. The system of claim 25 wherein the controller is configured to calculate a compensation gain tilt by multiplying the change in power by a constant value, and wherein the controller is configured to adjust the gain tilt of the optical amplifier via the tilt controller based on the calculated gain tilt.

31. The system of claim 25 wherein the optical amplifier includes a first stage and a second stage, and wherein the tilt controller is coupled to at least one of the first or second stages.

32. The system of claim 31 wherein the first and second stages each comprise an erbium-doped fiber amplifier.

33. The system of claim 31 wherein the previously measured power includes a first output power of the inline amplifier and the currently measured power includes a second, subsequent output power of the inline amplifier, and wherein the controller is configured to adjust a gain tilt of the optical amplifier via at least one of the first and second stages based on the change in power from the first and second measured output powers.

34. The system of claim 31 wherein the previously measured power includes a first input power of the inline amplifier and the currently measured power includes a second, subsequent input power of the inline amplifier, and wherein the controller is configured to adjust a gain tilt of the optical amplifier via at least one of the first and second stages based on the change in power from the first and second measured input powers.

35. The system of claim 25 wherein the tilt controller comprises a variable optical attenuator.

36. The system of claim 25 wherein the tilt controller comprises a dynamic gain equalizer.

37. The system of claim 25 wherein the tilt controller comprises a tunable optical filter.

* * * * *

UNITED STATES PATENT AND TRADEMARK OFFICE
CERTIFICATE OF CORRECTION

PATENT NO. : 7,460,297 B2 Page 1 of 1
APPLICATION NO. : 11/515196
DATED : December 2, 2008
INVENTOR(S) : Michael H. Eiselt It is certified that error appears in the above-identified patent and that said Letters Patent is hereby corrected as shown below:

Column 5,
Line 34, after "EDFA," delete "and" and then begin a new paragraph starting with "wherein the currently measured...".

Signed and Sealed this

Sixteenth Day of March, 2010

David J. Kappos
*Director of the United States Patent and Trademark Office*